United States Patent Office 2,713,861
Patented July 26, 1955

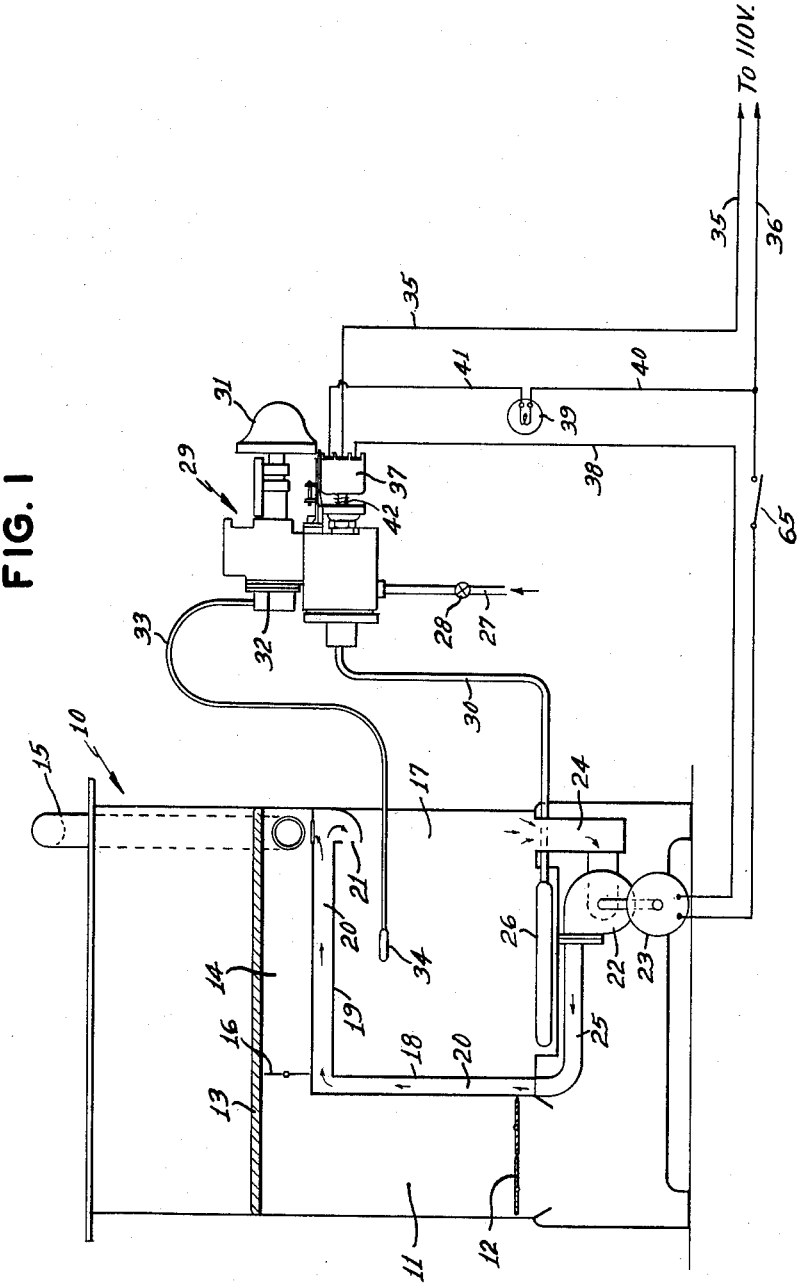

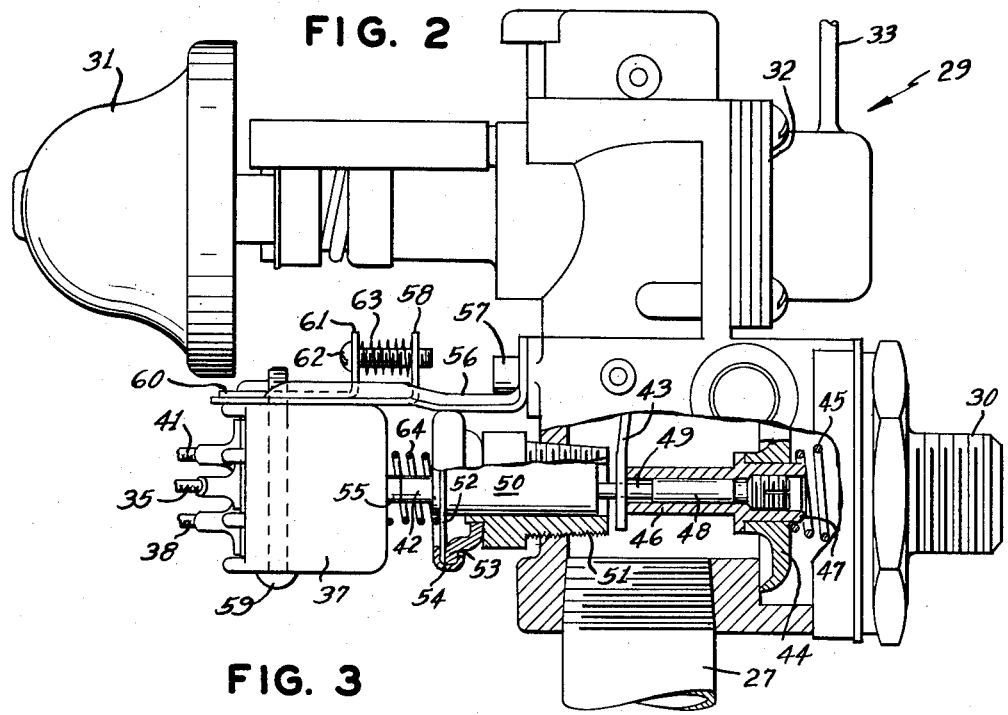
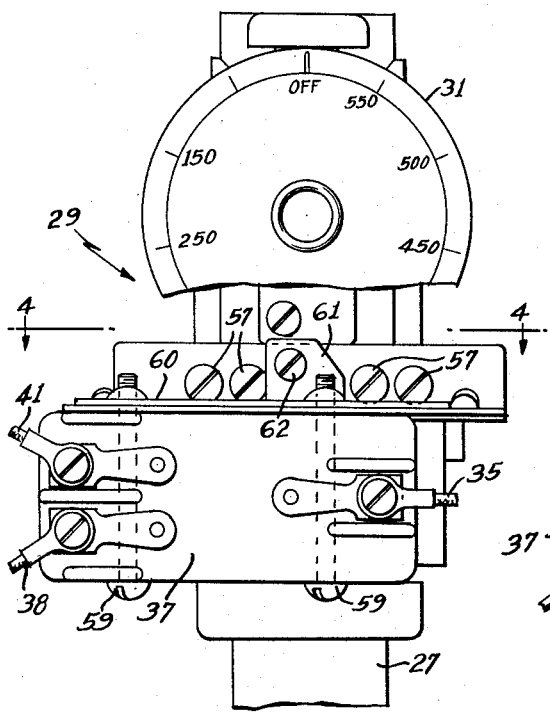
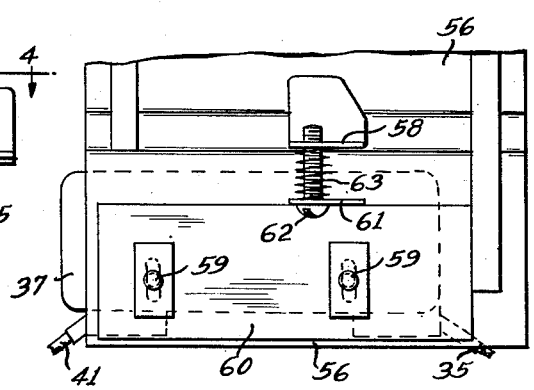

2,713,861

ALTERNATE FUEL HEATING APPLIANCE AND THERMOSTATIC CONTROL THEREFOR

William Porter Biddle, Jr., Knoxville, Tenn., and Theodore E. Graves, West Orange, N. J., assignors to The Wilcolator Company, Elizabeth, N. J., a corporation of Delaware Application June 29, 1951, Serial No. 234,302

4 Claims. (Cl. 126—36)

This invention relates to improvements in gas heating appliances adapted to use an alternate fuel such as coal, and a thermostatic control for such appliances.

Appliances of this type are used in New England and on farms in other parts of the United States. For example, kitchen cooking stoves, provided with a fire box for burning coal, wood or oil and also with surface gas burners and a gas burner for directly heating the oven, are commonly used. In the wintertime such stoves are fired with coal, wood or oil and used for cooking and for heating the kitchen, while in the summer gas is used for cooking in order to avoid overheating the kitchen.

The present invention particularly concerns the solution of the problem of controlling the temperature of the oven in appliances of this type, whether heated directly by the gas burner or indirectly by the alternate fuel. Ovens which are heated by gas alone are conventionally controlled by a thermostat and, according to the invention, a thermostatic control is provided for controlling the temperature of the oven when heated either with gas or with the alternate fuel, or with both fuels.

The primary object of the present invention is, therefore, a simple and effective thermostatic control for an oven, whether it is heated directly with gas or with an alternate fuel.

Another object of the invention is to provide an alternate fuel-gas heating apliance having an oven which may be heated directly by a gas burner and by an alternate fuel, such as coal, and which includes means for controlling the temperature of the oven regardless of which of the two fuels is employed.

The improved heating appliance for using alternate fuels according to the invention includes an oven to be heated by a gas burner and by a combustion chamber for coal, wood or oil. The appliance includes means associated with the combustion chamber for heating air which is conducted to the oven under forced circulation by a blower driven by an electric motor and a switch for controlling the supply of electric current to the motor. The heating of the oven with either type of fuel is controlled by a thermostat responsive to changes in the oven temperature, the thermostat including a throttling valve for the gas and being operatively associated with the switch so that the valve and switch are operable in synchronism to effect movement of the switch to closed position when the valve is moved to open position and movement of the switch to open position when the valve is moved to closed position.

In a preferred construction, the thermostat provided for appliances of this type includes a throttling valve for controlling the supply of the heating gas, the valve being movable to open and closed positions by the action of the thermostat, an electric switch for controlling the supply of electric current to an electric circuit such as that including the fan motor, and means actuated by the thermostat for simultaneously actuating the switch and the throttling valve. In this construction the switch is operated to one position, preferably its closed position, when said valve is moved to open position and to its opposite position when said valve is moved to closed position. The means included as a part of the thermostat and actuated thereby preferably includes a sealed plunger interconnected with the throttling valve and the operating mechanism of the thermostat.

Appliances of the type under consideration which are provided with an oven temperature control which is effective regardless of the particular fuel being used, have the distinct advantage that consistent cooking results may be obtained regardless of the fuel or fuels being used at a particular time. Furthermore, when a change of fuel is made, as from gas to coal, the operator need not change his habit of relying upon the thermostatic control to effect proper control of the oven temperature. Furthermore, the thermostatic control of the present invention avoids the necessity of controlling the coal fire accurately in order to secure a given baking result in the oven.

The improved heating appliance and thermostatic control of the present invention includes other features and advantages described hereinafter in connection with an illustrative embodiment thereof shown in the accompanying drawings forming a part of this application.

In the drawings:

Fig. 1 is a diagrammatic view showing some of the elements of a stove according to the invention and the thermostatic control associated therewith.

Fig. 2 is an elevational view, partly in section and on a larger scale, of the thermostatic control shown in Figure 1.

Fig. 3 is a broken elevational view, looking from the left in Figure 2.

Fig. 4 is a broken plan view taken on the line 4—4 of Figure 3.

The appliance shown in Figure 1 of the drawings comprises a cooking stove 10 having a fire box 11 in which wood, coal or oil may be burned, the fire box being provided with a grate 12. The stove includes the usual cooking top 13 heated by coal or other alternate fuel and provided with the usual surface gas burners, not shown. The products of combustion from the fire box pass through a flue 14 under the cooking top 13 and out to a chimney through a stove pipe 15. A damper 16 is provided in the flue 14 or it may be located in the pipe 15, or a duct leading thereto.

The stove shown in Figure 1 also includes an oven 17, defined in part by a side wall 18, and a top wall 19, which form a passageway 20 in heat exchange with the back wall of the fire box 11 and the flue 14. When the oven is heated by fire in the fire box 11, the air in the passageway 20 is also heated and is used for heating the oven by circulating this air into the oven through an opening 21. Positive circulation is effected by a circulating fan or blower 22 driven by an electric motor 23, air being drawn into the fan from the oven through a duct 24 and delivered into the lower part of the passageway 20 through a duct 25.

Provision is made for directly heating the oven by means of a gas burner 26, supplied with gas from the usual gas main through a pipe 27 having a control valve 28, the pipe 27 being connected into a thermostatic control 29, from which gas is delivered through a pipe 30 to the burner 26.

The thermostat 29 is normally mounted in a convenient part of the stove 10 but, in order to simplify the description, it is shown diagrammatically outside the stove. The oven thermostat 29 includes a hand operated dial 31, a temperature responsive mechanism located generally at 32 and connected by a capillary 33 to a bulb 34 mounted in the oven. The dial 31 is provided with a setting for "off" position and graduated temperature settings from 150° to 550° F., as shown in Figure 3 of the drawings.

When the stove 10 is being heated with gas, as in the summertime, and the operator desires to use the oven for a baking or roasting operation, the dial 31 is rotated clockwise from the "off" position to the desired oven temperature, for example 350° F., thus setting the thermostat 29 to control the oven temperature. Now the valve 28 is turned to open position to admit gas to the thermostat and to the burner 26. When the oven is heated to the set temperature, the fluid in the bulb 34 expands to actuate the temperature responsive mechanism 32 to close a throttling valve in the thermostat for decreasing or cutting off the gas flow to the burner 26. During the baking or roasting operation the thermostat 29 cycles the gas on and off to maintain the oven temperature.

When an alternate fuel, such as coal, is used in the fire box 11, as in wintertime, a baking operation and a controlled oven temperature is obtained by the thermostatic control and cooperating system generally illustrated in Figure 1 of the drawings, it being understood that the gas valve 28 will be closed and that the circulating fan 22 will be operated to circulate air in heat exchange with the fire box to heat the oven. Electric current for operating the motor 23 is supplied through leads 35 and 36, which may be connected by a plug or switch with the usual 110 volt house current, the lead wire 36 being connected directly to the motor 23 while the lead wire 35 is connected into a snap-acting microswitch 37, connected by a lead 38 with the motor 23. A pilot or indicator light 39 is connected in parallel with motor 23 by leads 40 and 41, connected into the lead 36 and the switch 37, respectively.

The microswitch 37 is normally biased to closed position and is opened by a plunger 42 actuated by the oven thermostat 29 in synchronism with the throttling valve of the thermostat so that when the valve is open the switch 37 will be closed and when the valve is closed the switch 37 will be open.

Now assuming that a fire is burning in the fire box 11 and the operator desires to conduct a baking operation in the oven 17, the dial 31 of the oven thermostat is rotated clockwise from the "off" position to the desired baking or roasting temperature, for example, 375° F. This setting of the dial 31 opens the throttling valve and closes the switch 37, thereby supplying electric current to the motor 23 which in turn operates the circulating fan 22 to circulate air through the heating duct 20 and into the oven. As the oven heats up, the fluid in the bulb 34 expands and, as the set temperature is reached, the switch 37 is operated to open position. This stops the motor 23 and the circulating fan 22 until the temperature falls again in the oven and the thermostat starts the cycle again.

The details of construction of the thermostatic control 29 are shown in Figures 2, 3 and 4 of the drawings from which it can be seen that, in general, the gas control part of the thermostat is of a known type appropriately modified in accordance with the concept of the invention to provide a dual control.

The temperature responsive mechanism 32 of the control, when actuated by temperature changes in the oven, moves a lever 43 back and forth from left to right as seen in Figure 2. Rotation of the dial 31 also effects movement of the lever 43 in a known manner, to in turn open or close a throttling valve 44 which regulates the flow of heating gas through the pipe 30 to the oven burner 26. The valve 44 is biased to closed position by a spring 45 so that the principal action of the dial 31 and the temperature responsive mechanism 32, on the valve 44, is to actuate the lever 43 to force the valve to open position against the spring 45 and to release it for closing by the spring 45.

Figure 2 shows a preferred construction of the thermostat in which the valve 44 includes an axially and rigidly mounted sleeve 46 extending forward, and having its inner end bearing against the lever 43. This sleeve includes an enlarged internally threaded section 47 in which the head of an adjusting pin 48 is threaded. The head of the pin 48 is slotted to receive a screwdriver so that the position of the opposite end of the pin may be adjusted for actuating the switch 37 at the proper time with respect to the position of the valve 44. The pin 48 has a portion fitting the inside of the sleeve 46 and an end portion 49 which extends through a slot in the end of the lever 43 and engages the end of a shaft 50 slidably mounted in a nipple 51 screwed into the front of the body of the thermostat directly opposite the position of the valve 44.

The shaft 50 and plunger 42 are integral with each other and extend axially through a diaphragm disc 52 which is fixed against a shoulder formed between the shaft 50 and the smaller diameter plunger 42. The peripheral portion of the diaphragm 52 is secured in sealing relation to the face of a flange member 53 which is welded or otherwise secured to the nipple 51. The periphery of the disc 52 is held in fixed sealing relation to the face of the flange 53 by means of a peripheral ring 54 which is rolled over around the flange member 53. The pin 48 is adjusted so that the plunger 42 is actuated to switch-opening position just at the point where the valve 44 is reaching its seat, or the throttling position.

The microswitch 37 is mounted directly in front of the plunger 42 with its button or plunger 55 engaged by the plunger 42. The mounting arrangement, as shown in Figures 2, 3 and 4, comprises a bracket 56 having an upwardly extending flange to the right in Figure 2 by which it is secured to the body of the thermostat by screws 57. This bracket has a cut out upwardly bent flange 58.

The microswitch 37 is mounted directly under the bracket 56 and secured thereto by means of long screw bolts 59 which extend through the switch, through spaced slots in the bracket 56 and a plate 60 resting on the bracket 56 and having a bent-up flange portion 61 facing the bent-up flange 58. A screw bolt 62 extends through a hole in the member 61 and a spring 63 and is threaded into a hole in the flange 58 for the purpose of adjusting the position of the switch 37 with respect to the end of the plunger 42.

The adjustment referred to is made after the adjustment of the pin 48, in order to synchronize the action of the switch 37 with that of the valve 44. The bolts 59 are loosened and the screw 62 adjusted until the switch button 55 engages the plunger 42 and is positioned so the switch 37 is opened as the valve 44 is reaching its seat. Thereafter, the bolts 59 are tightened and the switch is held rigidly in place for operation when the plunger 42 is moved. This adjustment may be obtained by turning the dial to its "off" position and then turning the screw 62 clockwise to move the switch 37 toward the body of the thermostat until the light 39 is extinguished and the motor 23 stops. At this point, an additional one-fifth of a turn is given to the screw 62 so that the switch will open just before the valve 44 touches its seat.

The switch 37 may be of suitable conventional snap-acting type, such as a known type of microswitch biased to closed position. In the switch, as illustrated, two outlet contacts are shown so that the electric motor 23 and the pilot light 39 may be operated in parallel.

Referring to Figure 2 of the drawings, the movement of the various parts of the thermostatic control will be referred to in connection with the movement of the lever 43 when the dial 31 is rotated or the temperature responsive mechanism 32 responds to changes in oven temperature. Assuming that the dial 31 is in the "off" position, the parts of the control mechanism will be in the positions shown in Figure 2 with the valve 44 closed and the switch 37 open. When the dial 31 is rotated to a temperature setting, pressure is applied to the lever 43 to swing it to the right and open the valve 44. At the same time, a spring 64, mounted between the switch 37 and the diaphragm 52, around button 55 and the plunger 42, moves the shaft 50 to the right to follow the movement of the pin 49 and sleeve 46, thereby closing the switch 37. When the dial is turned to "off" position, or when the temperature in the oven reaches the set temperature, the lever 43 is swung to the left permitting the spring 45 to move the valve 44 toward closed position and the shaft 50 toward the diaphragm seal 52 and the switch 37 to open position. Just before the valve 44 reaches its seat, the switch 37 snaps off. The spring 45 has sufficient power to overcome the spring 64 and the spring action of the switch 37.

The foregoing movements of the mechanism shown in Figure 2 of the drawings take place, regardless of the particular fuel being used in the stove 10. In the season of the year when gas is being used, the electric lines 35 and 36 may be disconnected, or the motor only disconnected by opening a switch 65. The opening of this switch will permit the use of the pilot or indicator light 39 when gas is used as the fuel for the stove 10.

In wintertime, when coal or other alternate fuel is used in the stove 10, the gas valve 28 is maintained closed, or the main gas valve is closed, so that no gas will flow to the burner 26 when the valve 44 moves in response to changes in oven temperature.

The appliance and thermostatic control of the present invention permits the ready and convenient use of an alternate fuel such as coal, wood and oil in gas heated appliances and, at the same time, provides a convenient and accurate control of the ovens of such appliances. When either fuel is used, the thermostat acts effectively to control the heating of the oven and to control the operation of the indicator to show when the oven is ready to receive the food to be cooked, it being understood from the operations described above, that when the oven reaches the set temperature the switch 37 is turned to "off" position and the light 39 is extinguished. Therefore, as long as the operator sees the light 39 on, he will understand that the oven is "on" and that the oven has not reached the set temperature, and that when the light is extinguished the oven is ready for use.

The electrical circuit associated with the thermostatic control may be used to operate a means or device other than an electric motor and fan for effecting the heating and control of an oven. For example, such means or device may be a valve, a damper, a solenoid or other means.

It should be understood that the signal light circuit may also be connected so that the signal light is "off" while the oven is being heated and comes on when the oven is ready for use, and that this signal light may be used either when the oven is heated by gas or by the auxiliary fuel.

What is claimed as new is:

1. In an alternate fuel heating appliance including an oven to be heated, a gas burner for heating the oven, a valve for controlling the flow of fuel to the gas burner, said valve being movable between closed and open positions, a combustion chamber in which a different type of fuel may be burned, means associated with the combustion chamber for heating air, means for conducting heated air from said air heating means to said oven to heat the same, a blower for passing air from said air heating means through said conducting means to the oven, an electric motor for operating said blower, a switch for controlling the supply of electric current to said motor and operable between open and closed positions, a thermostat responsive to changes in the oven temperature, said thermostat being operatively associated with said valve and said switch for operating them in synchronism to move the switch to closed position when the valve is moved to open position and to move the switch to open position when the valve is moved to closed position.

2. In an alternate fuel heating appliance including an oven to be heated, a gas burner for heating the oven, a valve for controlling the flow of fuel to the gas burner, said valve being movable between a first position in which the valve is closed and a second position in which the valve is open, a combustion chamber in which a different type of fuel may be burned, means associated with the combustion chamber for heating air, means for conducting heated air from said air heating means to said oven to heat the same, a blower for passing air from said air heating means through said conducting means to the oven, an electric motor for operating said blower, a switch for controlling the supply of electric current to said motor and operable between a first position in which the switch is open and a second position in which the switch is closed, and a thermostat responsive to changes in the oven temperature, said thermostat being operatively associated with said valve and said switch for operating them in synchronism to effect movement of said switch to its closed and open positions and said valve to its open and closed positions, respectively.

3. In an alternate fuel heating appliance including an oven to be heated, a gas burner for heating the oven, a valve for controlling the flow of fuel to the gas burner, said valve being movable between a first position in which the valve is closed and a second position in which the valve is open, a combustion chamber in which a different type of fuel may be burned, means associated with the combustion chamber for heating air, means for conducting heated air from said air heating means to said oven to heat the same, a blower for passing air from said air heating means through said conducting means to the oven, an electric motor for operating said blower, a switch for controlling the supply of electric current to said motor and operable between a first position in which the switch is open and a second position in which the switch is closed, a thermostat responsive to changes in the oven temperature, and a control means operatively associated with said valve and said switch for operating them in synchronism, said control means being actuable by the thermostat for effecting movement of said switch to its closed and open positions and said valve to its open and closed positions, respectively.

4. In an alternate fuel heating appliance, including an oven to be heated, a gas burner for heating the oven, a combustion chamber in which a different type of fuel may be burned, means associated with the combustion chamber for heating air, means for conducting heated air from said air heating means to the oven for heating the same, a blower for forcing air from said air heating means through said conducting means to the oven for heating the oven, an electric motor for operating said blower, a thermostat responsive to changes in the oven temperature for controlling the operation of the gas burner for heating the oven and the blower for supplying heated air for heating the oven, said thermostat including a valve for controlling the flow of gas to the gas burner, a switch for controlling the supply of electric current to said motor for operating said blower, and means responsive to the operation of the thermostat for operating said valve and said switch in synchronism for effecting movement of the switch to its closed and open positions and said valve to its open and closed positions, respectively, whereby the temperature in said oven may be effectively controlled when the oven is heated either by gas supplied to said gas burner or by a different type of fuel supplied to said combustion chamber for heating air in said air heating means.

References Cited in the file of this patent

UNITED STATES PATENTS

| | | |
|---|---|---|
| 1,177,857 | Gilbert | Apr. 4, 1918 |
| 1,700,428 | Breese | Jan. 29, 1929 |
| 1,840,744 | Scott | Jan. 12, 1932 |
| 2,276,751 | Weber | Mar. 17, 1942 |
| 2,282,489 | Madlem | May 12, 1942 |
| 2,333,261 | Mantz | Nov. 2, 1943 |
| 2,335,263 | Dicke | Nov. 30, 1943 |
| 2,353,278 | Stockstrom | July 11, 1944 |
| 2,412,990 | Kruse | Dec. 24, 1946 |
| 2,414,305 | Hurlburt | Jan. 14, 1947 |
| 2,417,842 | Sanford | Mar. 25, 1947 |
| 2,463,712 | Newell | Mar. 8, 1949 |